(12) United States Patent
Zimmerman et al.

(10) Patent No.: US 7,934,233 B2
(45) Date of Patent: Apr. 26, 2011

(54) METHOD AND SYSTEM FOR PROVIDING COMPLEMENTARY INFORMATION FOR A VIDEO PROGRAM

(75) Inventors: John Zimmerman, Pittsburgh, PA (US); Nevenka Dimitrova, Yorktown Heights, NY (US); Dongge Li, Palatine, IL (US); Johanna Maria Bont, Eindhoven (NL); Andreas Henricus Elisabeth Lamers, Eindhoven (NL); Angel Janevski, New York, NY (US); Lira Nikolovska, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1116 days.

(21) Appl. No.: 10/509,810

(22) PCT Filed: Apr. 1, 2003

(86) PCT No.: PCT/IB03/01344
§ 371 (c)(1),
(2), (4) Date: Sep. 30, 2004

(87) PCT Pub. No.: WO03/084229
PCT Pub. Date: Oct. 9, 2003

(65) Prior Publication Data
US 2005/0229233 A1    Oct. 13, 2005

Related U.S. Application Data

(60) Provisional application No. 60/369,358, filed on Apr. 2, 2002.

(51) Int. Cl.
*H04N 5/445* (2006.01)

(52) U.S. Cl. ........... 725/46; 725/11; 725/34; 725/43; 725/135; 725/136

(58) Field of Classification Search ............ 725/11, 725/43, 46, 34, 135, 136
See application file for complete search history.

(56) References Cited

U.S. PATENT DOCUMENTS

| | | | | |
|---|---|---|---|---|
| 5,523,796 A * | 6/1996 | Marshall et al. | | 725/41 |
| 5,687,347 A * | 11/1997 | Omura et al. | | 711/112 |
| 5,815,145 A * | 9/1998 | Matthews, III | | 725/41 |
| 5,867,205 A * | 2/1999 | Harrison | | 725/38 |
| 5,931,908 A * | 8/1999 | Gerba et al. | | 709/219 |
| 6,219,640 B1 * | 4/2001 | Basu et al. | | 704/246 |
| 6,239,794 B1 * | 5/2001 | Yuen et al. | | 725/41 |
| 6,348,932 B1 * | 2/2002 | Nishikawa et al. | | 715/719 |
| 2001/0018771 A1 * | 8/2001 | Walker et al. | | 725/91 |
| 2001/0030661 A1 | 10/2001 | Reichardt | | 345/721 |
| 2002/0016960 A1 * | 2/2002 | Yamato et al. | | 725/1 |
| 2002/0059602 A1 * | 5/2002 | Macrae et al. | | 725/42 |
| 2002/0116710 A1 * | 8/2002 | Schaffer et al. | | 725/46 |
| 2002/0152224 A1 * | 10/2002 | Roth et al. | | 707/104.1 |
| 2002/0188949 A1 * | 12/2002 | Wang et al. | | 725/46 |
| 2003/0167471 A1 * | 9/2003 | Roth et al. | | 725/87 |
| 2003/0237093 A1 * | 12/2003 | Marsh | | 725/46 |
| 2004/0054572 A1 * | 3/2004 | Oldale et al. | | 705/10 |

\* cited by examiner

*Primary Examiner* — Christopher Kelley
*Assistant Examiner* — Sahar A Baig
(74) *Attorney, Agent, or Firm* — Edward W. Goodman

(57) ABSTRACT

A method for providing complementary information 226 for a video program is provided that includes receiving complementary information 226 for a video program. A query is received from a consumer. The query is related to a specified portion of the complementary information 226. A query response is provided to the consumer based on the specified portion of the complementary information 226.

15 Claims, 15 Drawing Sheets

| FIRST NAME | SUZY |
| --- | --- |
| LAST NAME | LEE |
| STREET ADDRESS | 180 KATONAH AVE |
| CITY | KATONAH |
| STATE | NY |
| ZIP | 10536 |
| COMPANY NAME | THE WESTCHESTER |
| CO. STREET ADDRESS | 125 WESTCHESTER AVE |
| CO. CITY | WHITE PLAINS |
| CO. STATE | NY |
| CO. ZIP | 10601 |

FIG. 3A

| HOME TO JFK VIA WHITESTONE BRIDGE | SAW MILL RIVER PARKWAY SOUTH<br>I-684 SOUTH<br>HUTCHINSON PARKWAY<br>WHITESTONE BRIDGE<br>WHITESTONE EXPRESSWAY<br>VAN WYCK EXPRESSWAY |
| --- | --- |
| HOME TO MIDTOWN VIA HENRY HUDSON | SAW MILL RIVER PARKWAY SOUTH<br>HENRY HUDSON PARKWAY SOUTH<br>WESTSIDE HIGHWAY SOUTH |
| HOME TO QUEENS VIA TRIBORO BRIDGE | SAW MILL RIVER PARKWAY SOUTH<br>SPRAIN PARKWAY SOUTH<br>TRIBORO BRIDGE |
| HOME TO WORK | SAW MILL RIVER PARKWAY SOUTH<br>I-684 SOUTH<br>I-287 WEST |

| I-684 |
|---|
| I-287 |
| TAPPAN ZEE BRIDGE |
| HUTCHINSON RIVER PARKWAY |
| WHITESTONE BRIDGE |
| TRIBORO BRIDGE |

| DJIA | INDEX | DOW JONES INDUSTRIAL AVERAGE |
|---|---|---|
| NSDQ | INDEX | NASDAQ |
| ADM | STOCK | ARCHER-DANIELS-MIDLAND |
| AOL | STOCK | AOL TIME WARNER |
| DIS | STOCK | DISNEY |
| HD | STOCK | HOME DEPOT |
| IBM | STOCK | INTERNATIONAL BUSINESS MACHINES |
| PHG | STOCK | KONINKLIJKE PHILIPS ELECTRONICS |
| VIA | STOCK | VIACOM |
| VFINX | MUTUAL FUND | VANGUARD 500 INDEX FUND |
| VWUSX | MUTUAL FUND | VANGUARD U.S. GROWTH FUND |

| BASKETBALL | NEW YORK KNICKS |
|---|---|
| BASEBALL | NEW YORK YANKEES |
| HOCKEY | PITTSBURGH PENGUINS |

FIG. 3E

| PARTICIPANTS | LOCATIONS | KEYWORDS |
|---|---|---|
| ALL TRACKED SPORTS TEAMS | KATONAH | CHINESE |
| ALL TRACKED COMPANIES (STOCK) | WHITE PLAINS | AIRLINES |
| CHINA | QUEENS | MALLS |
| BUSH | NEW YORK CITY | SHOPPING |
| | CHINA | |

FIG. 3F

| MATCH TO PROFILE | 60% |
|---|---|
| DISTANCE FROM HOME | 20% |
| TIME UNTIL EVENT | 20% |

FIG. 4A

| MATCH TO PROFILE | 40% |
|---|---|
| BROADCASTER IMPORTANCE | 50% |
| HOW CURRENT HEADLINE IS | 10% |

FIG. 4B

| MATCH TO PROFILE | 50% |
|---|---|
| BROADCASTER IMPORTANCE | 35% |
| TIME SINCE/UNTIL EVENT | 15% |

FIG. 4C

| BROADCASTER IMPORTANCE | 60% |
| --- | --- |
| STORY DEPTH | SHALLOW |
| NOVELTY | 40% |

METHOD AND SYSTEM FOR PROVIDING COMPLEMENTARY INFORMATION FOR A VIDEO PROGRAM

This application claims the benefit of U.S. Provisional Application No. 60/369,358, filed Apr. 2, 2002.

The present invention relates generally to video content augmentation and, more particularly, to a method and system for providing complementary information for a video program.

When viewing video programs, consumers may desire to receive information related to the video program, such as actors' names. Currently available techniques for providing this type of information include audio commentary, typically from the director of a movie, available on a DVD. In addition, electronic program guides available over cable and satellite may offer limited credits for a particular program, such as actors' names and a date associated with the program. Another technique for providing additional information to the consumer includes enhanced television broadcasts that allow content creators to insert the information into real-time broadcasts.

However, electronic program guides are not synchronized to the program, while enhanced broadcasts do not support recorded material. In addition, DVDs and enhanced broadcasts do not allow consumers to have control, with the possible exception of activating or deactivating these features. DVDs also cannot update the information provided, making some of the information possibly obsolete or inaccurate at a later time.

In accordance with the present invention, a method and system for providing complementary information for a video program are provided that substantially eliminate or reduce disadvantages and problems associated with conventional systems and methods. In particular, complementary information is provided to a consumer when that information is requested by the consumer, complementary information may be synchronized with a video program, control over access and navigation of the complementary information is provided to the consumer, and the complementary information may be updated.

According to one embodiment of the present invention, a method for providing complementary information for a video program is provided. The method includes receiving complementary information for a video program. A query is received from a consumer. The query is related to a specified portion of the complementary information. A query response is provided to the consumer based on the specified portion of the complementary information.

According to another embodiment of the present invention, a system for providing complementary information for a video program is provided that includes a memory and a processor. The memory is operable to store user data tables and complementary information. The processor is operable to receive complementary information for a video program, to receive a query from a consumer, the query related to a specified portion of the complementary information, and to provide a query response to the consumer based on the specified portion of the complementary information.

Technical advantages of one or more embodiments of the present invention include providing an improved method for providing complementary information for a video program. In a particular embodiment, complementary information is provided to a consumer when that information is requested by the consumer. In addition, information that may be requested by the consumer may be anticipated and stored, along with user data that is specific to the consumer. The consumer-specific data may then be used to provide personalized complementary information.

Other technical advantages of one or more embodiments of the present invention include synchronizing complementary information with a video program, providing control over access and navigation of the complementary information to the consumer, and updating the complementary information.

Other technical advantages will be readily apparent to one skilled in the art from the following figures, description, and claims.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. In particular, a controller may comprise one or more data processors, and associated input/output devices and memory, that execute one or more application programs and/or an operating system program. Definitions for certain words and phrases are provided throughout this patent document, those of ordinary skill in the art should understand that in many, if not most instances, such definitions apply to prior, as well as future uses of such defined words and phrases.

For a more complete understanding of the present invention and its advantages, reference is now made to the following description taken in conjunction with the accompanying drawings, wherein like reference numerals represent like parts, in which.

Figure 1:
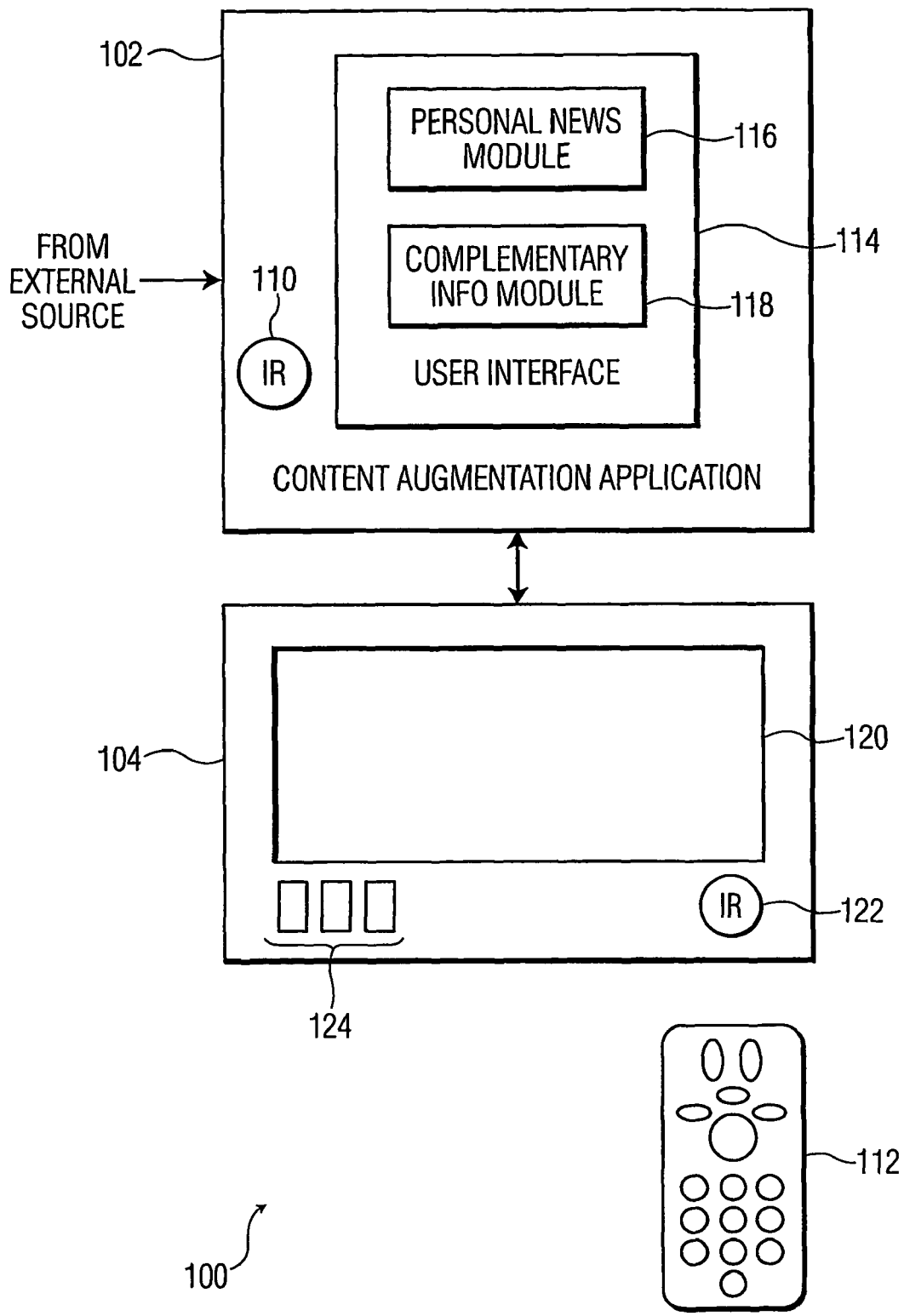
FIG. 1 is a block diagram illustrating a video display system operable to provide personalized news to a consumer in accordance with one embodiment of the present invention.
Figure 2:
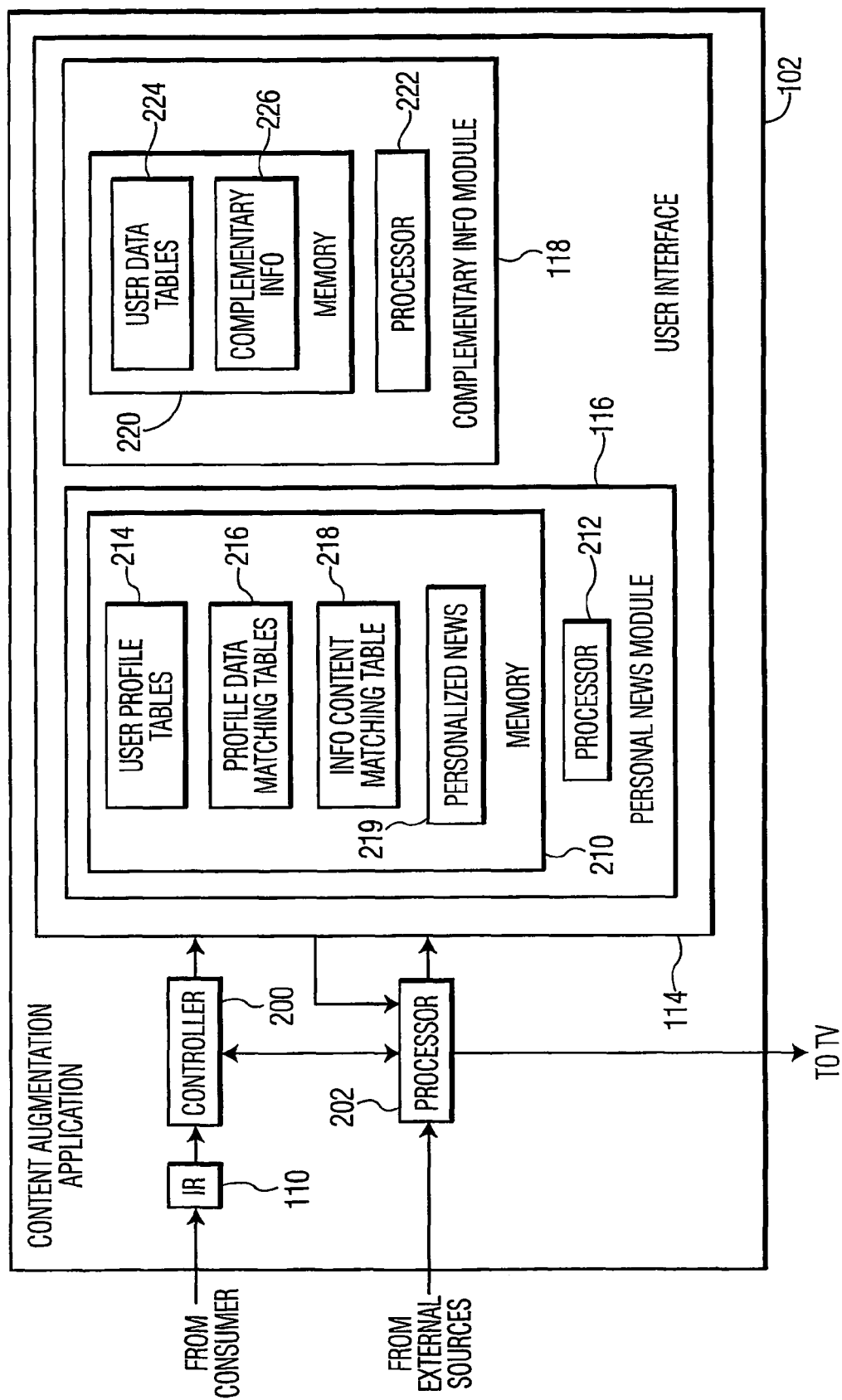
FIG. 2 is a block diagram illustrating the content augmentation application of FIG. 1 in accordance with one embodiment of the present invention.
Figures 5, 6:
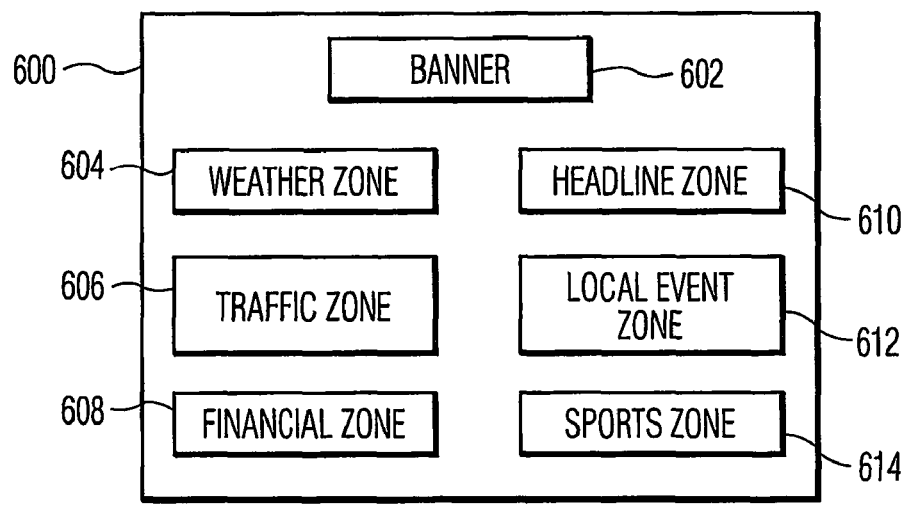
Figure 7:
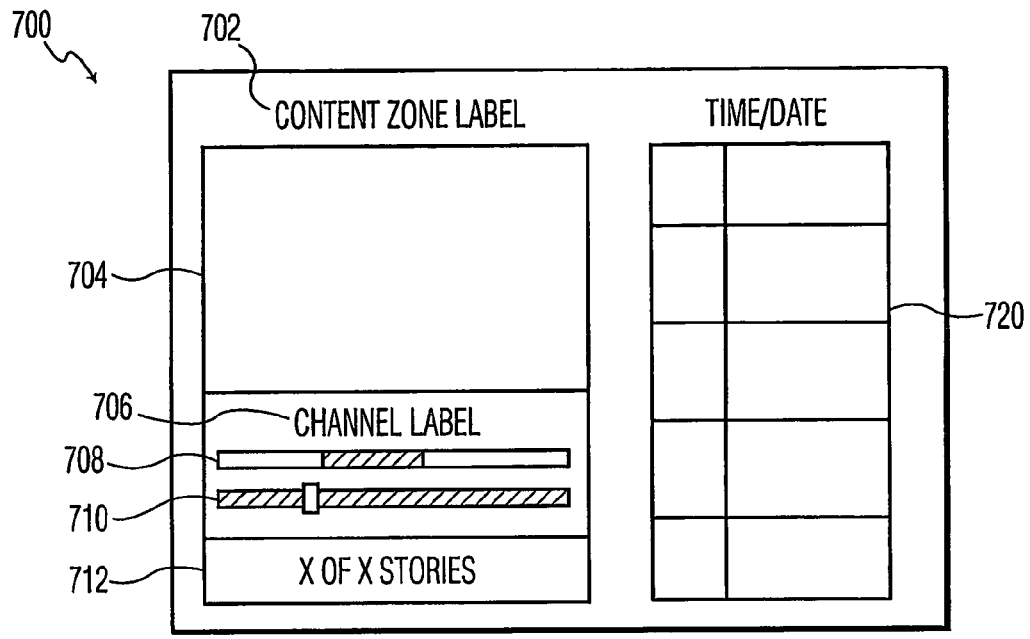
Figure 8:
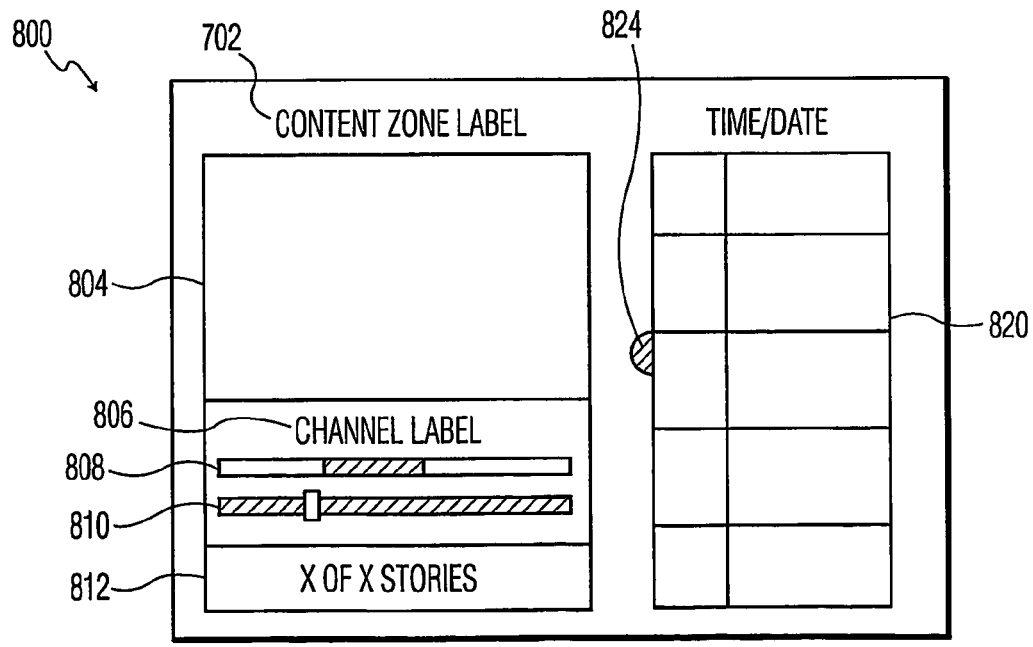
Figure 9:
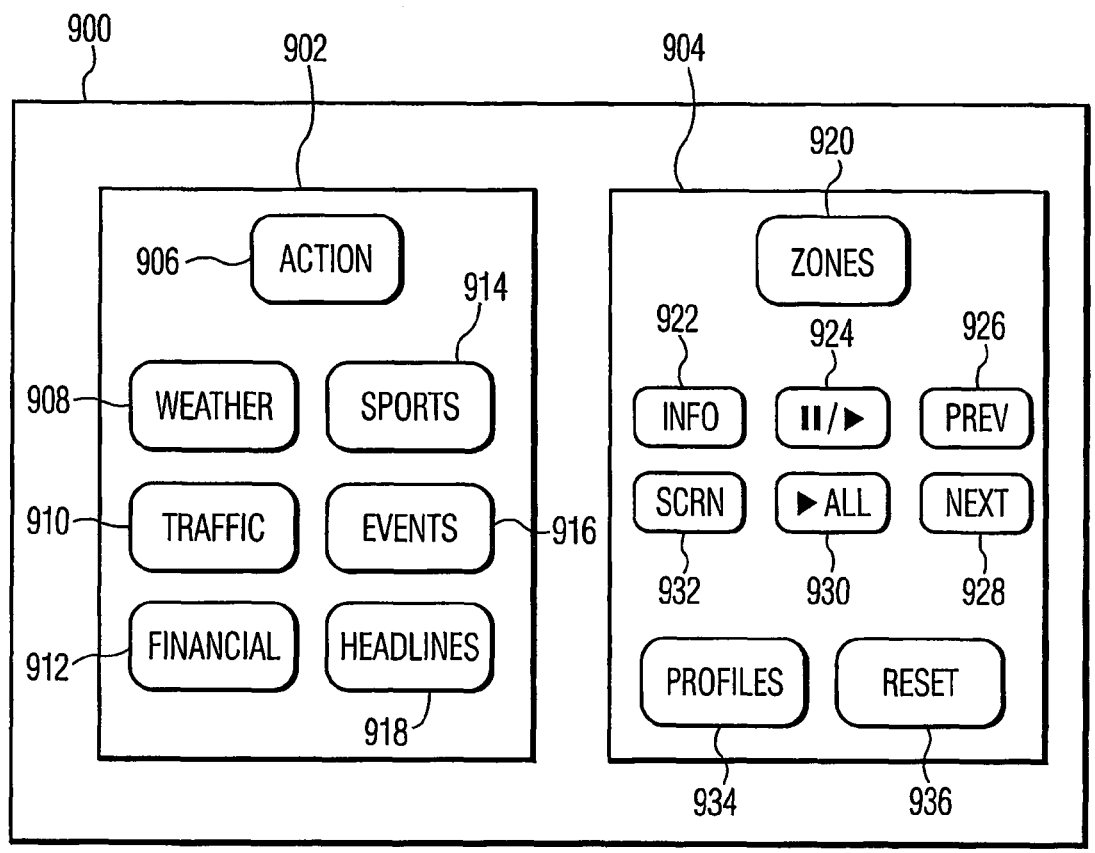
Figure 10:
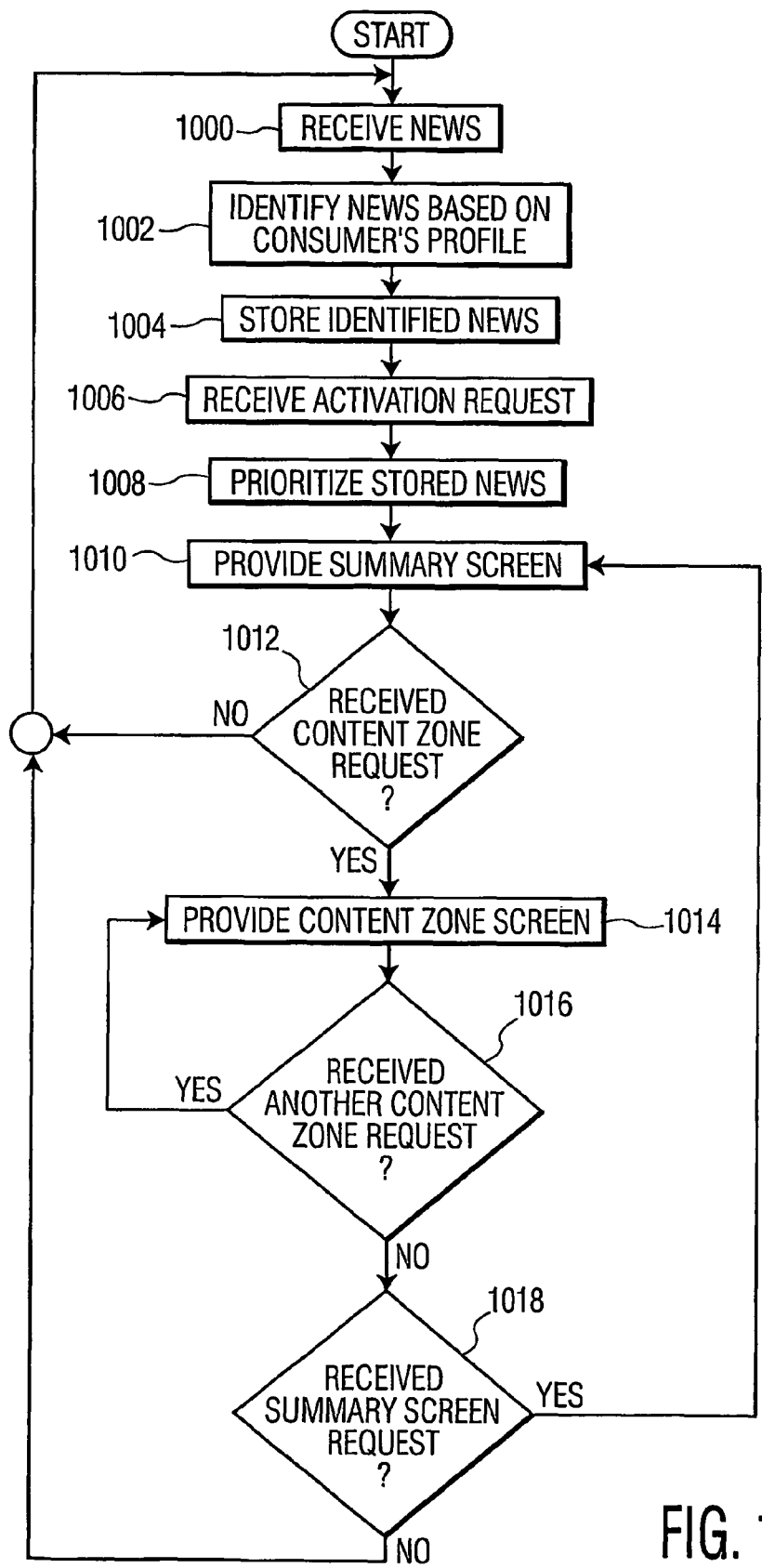
Figure 11A:
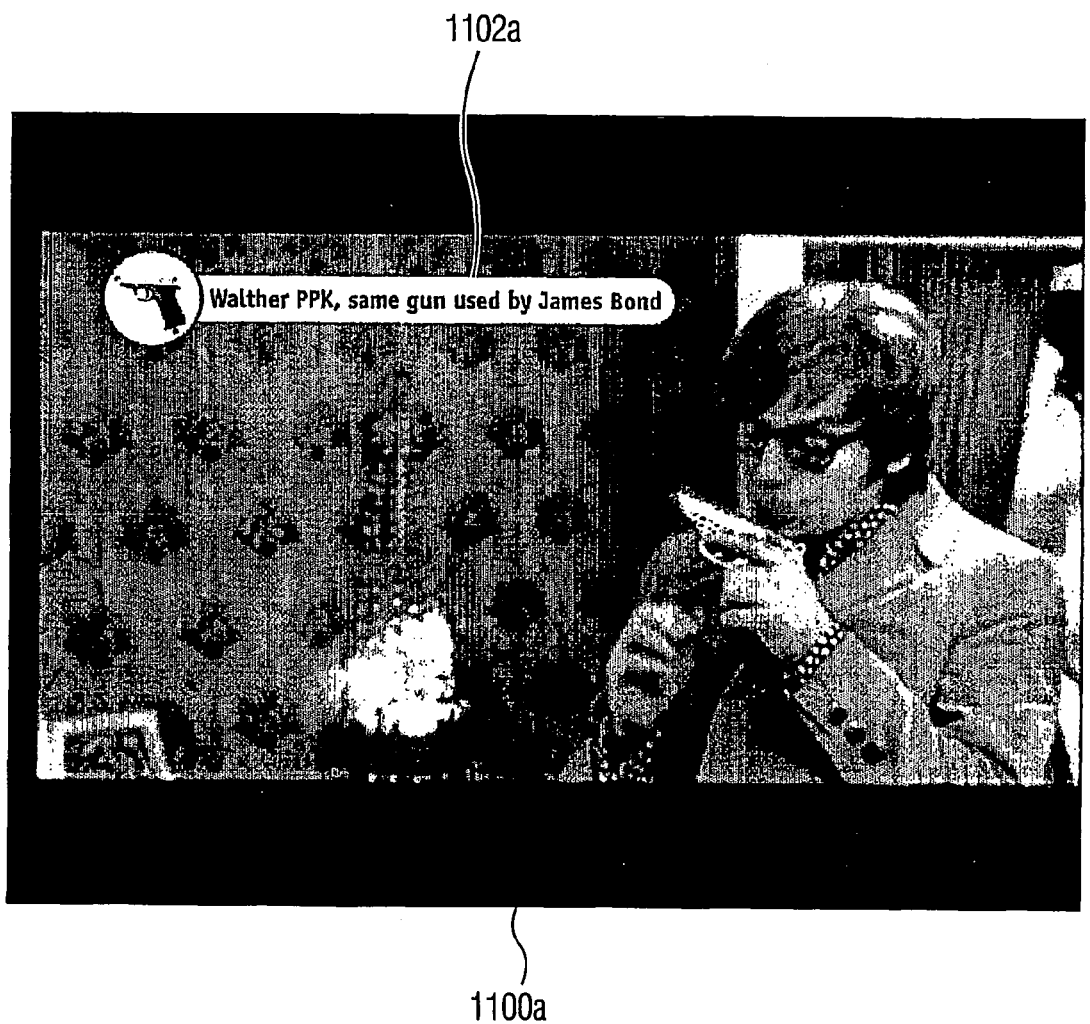
Figure 11B:
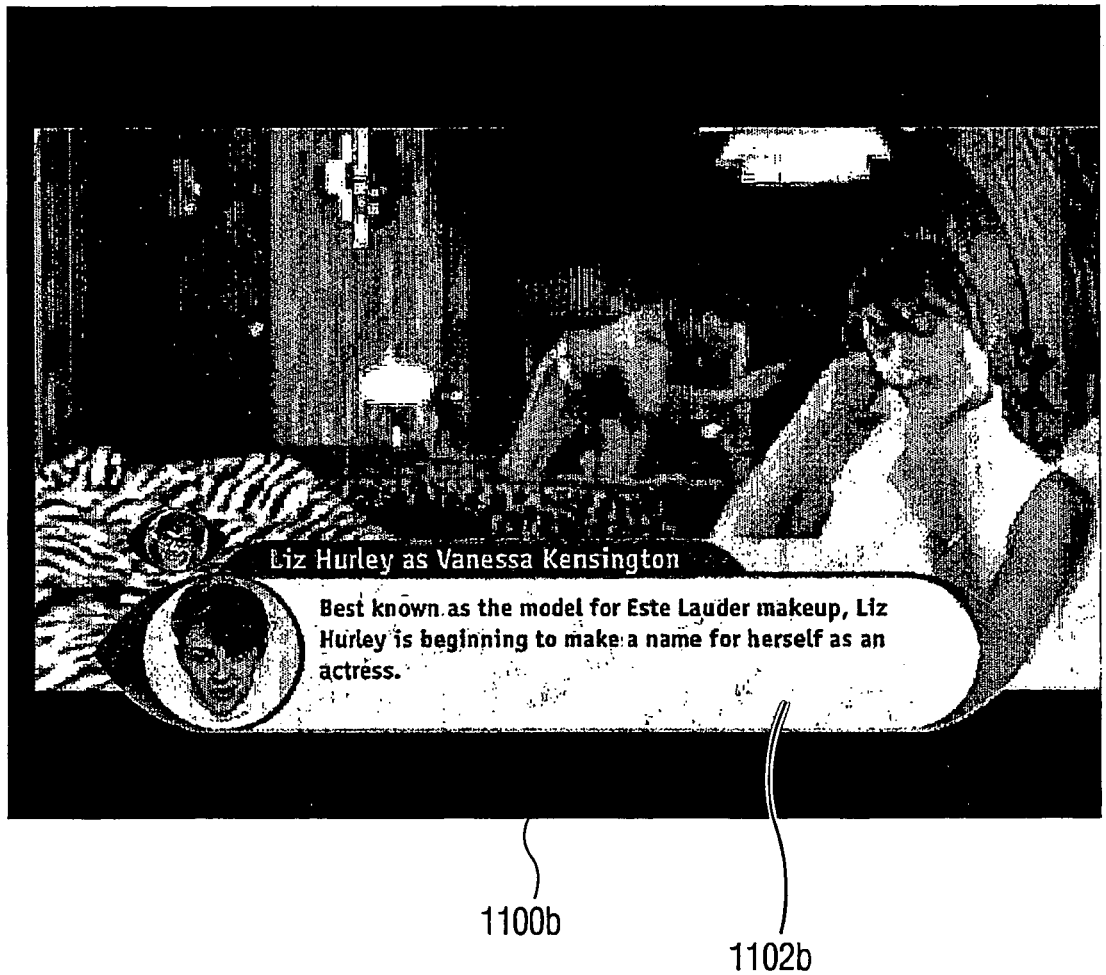
Figure 11C:
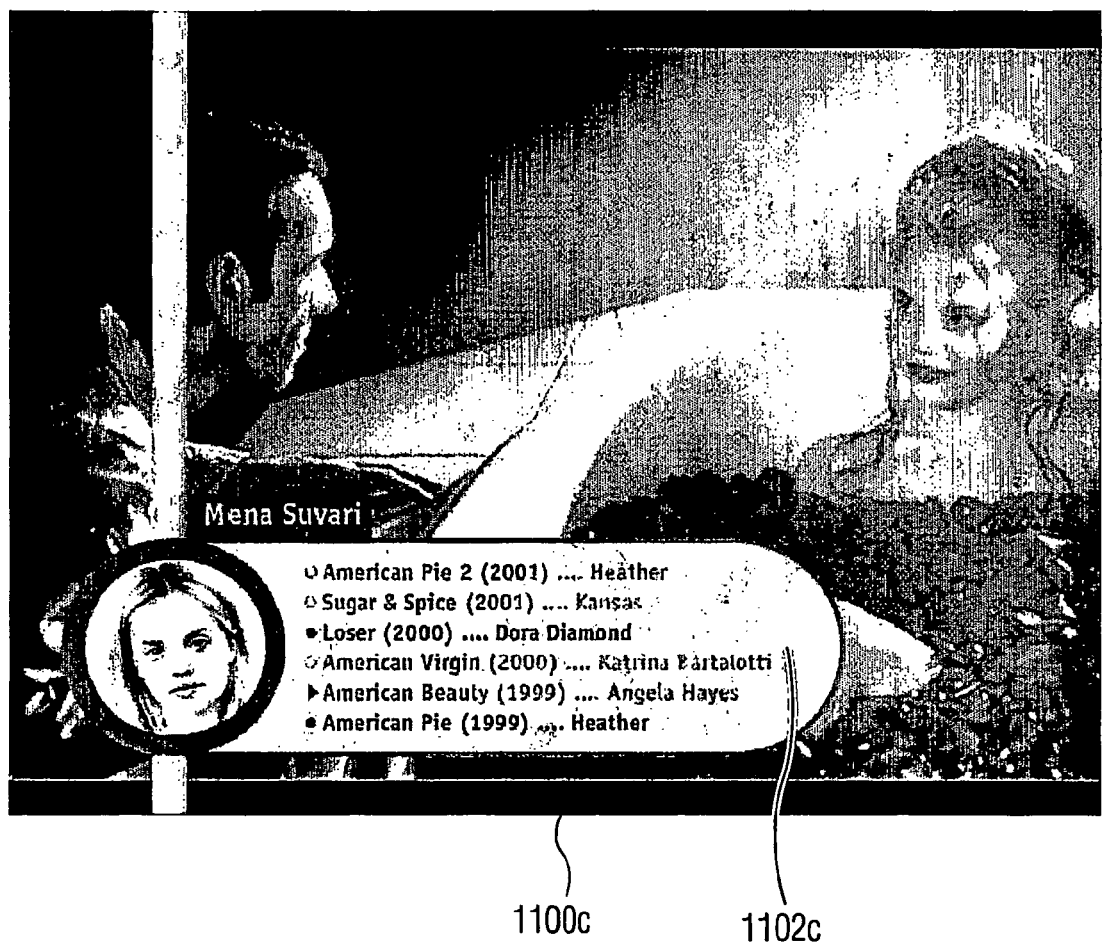
Figure 11D:
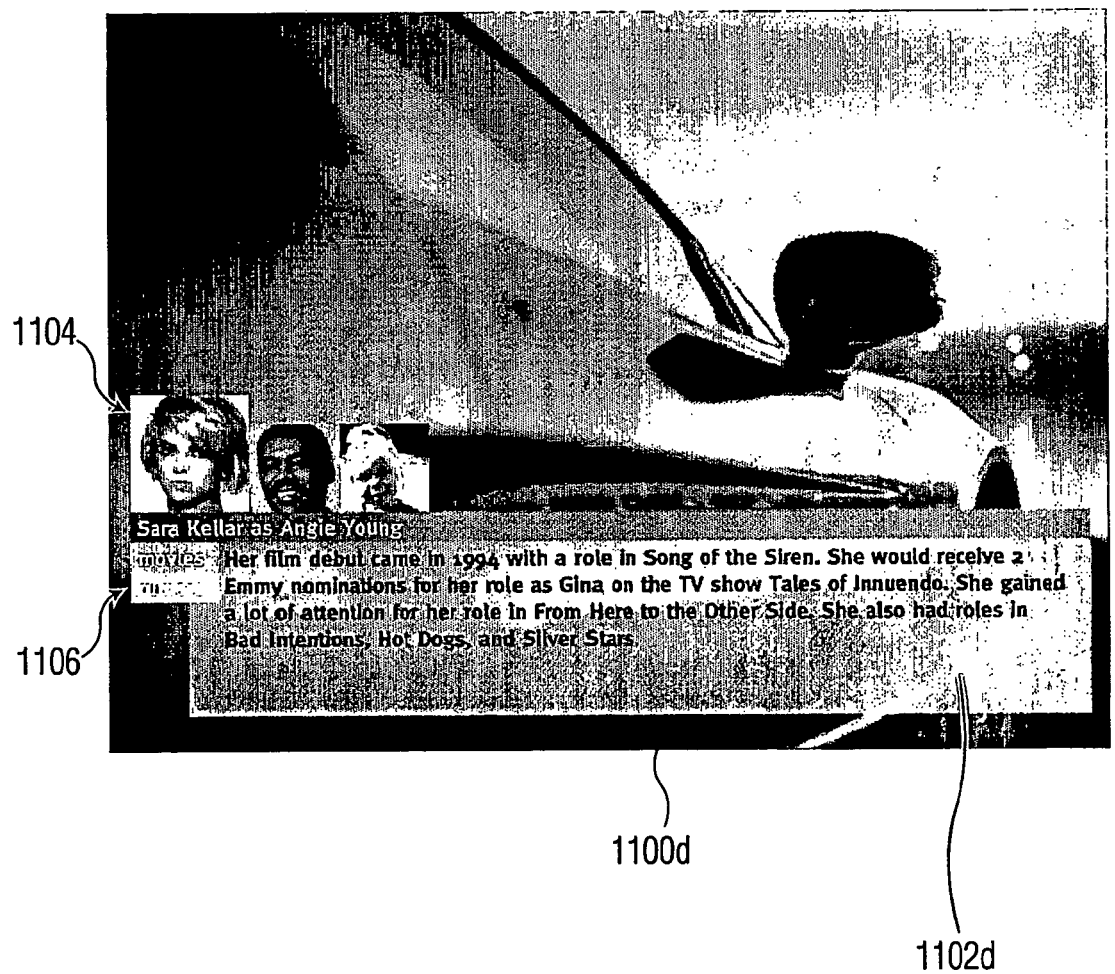
Figure 11E:
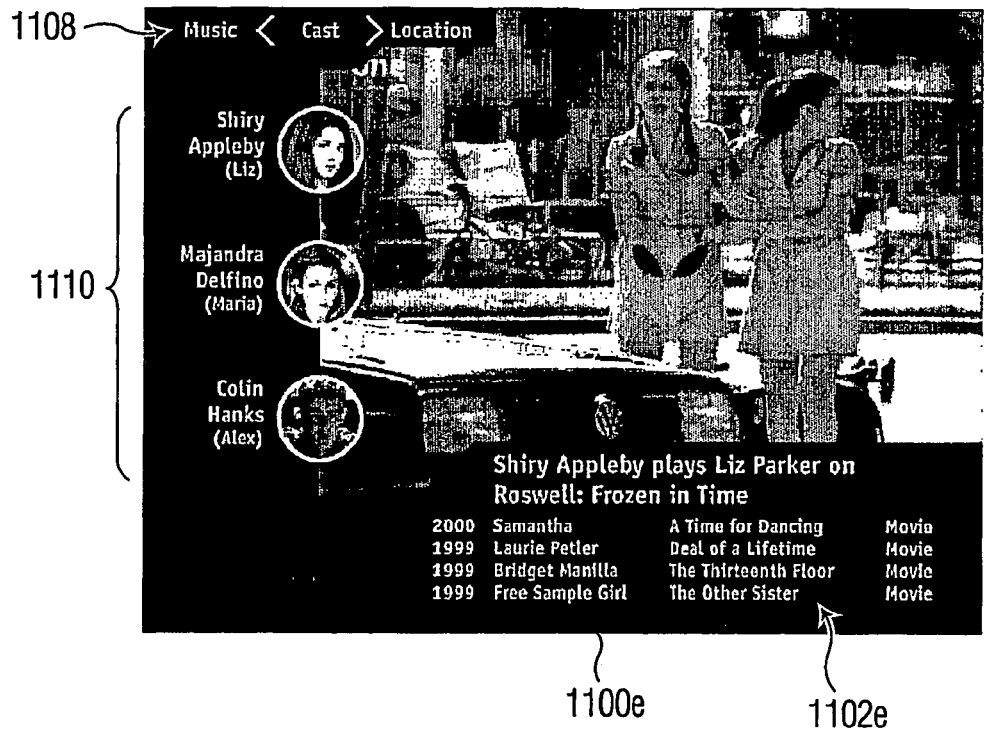
Figure 11F:
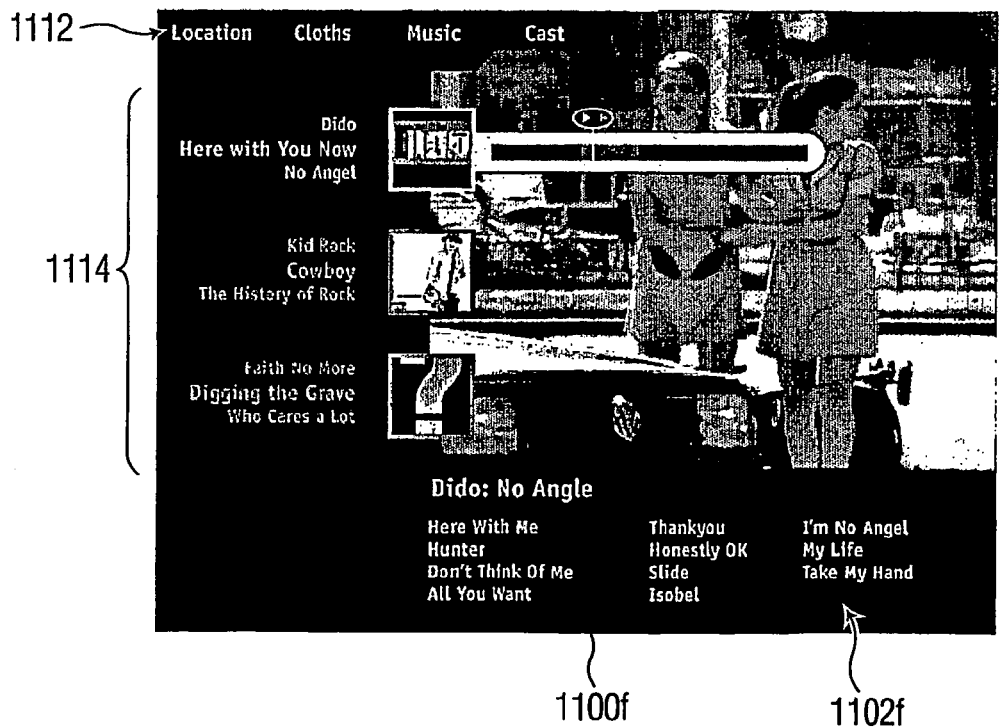
Figure 12:
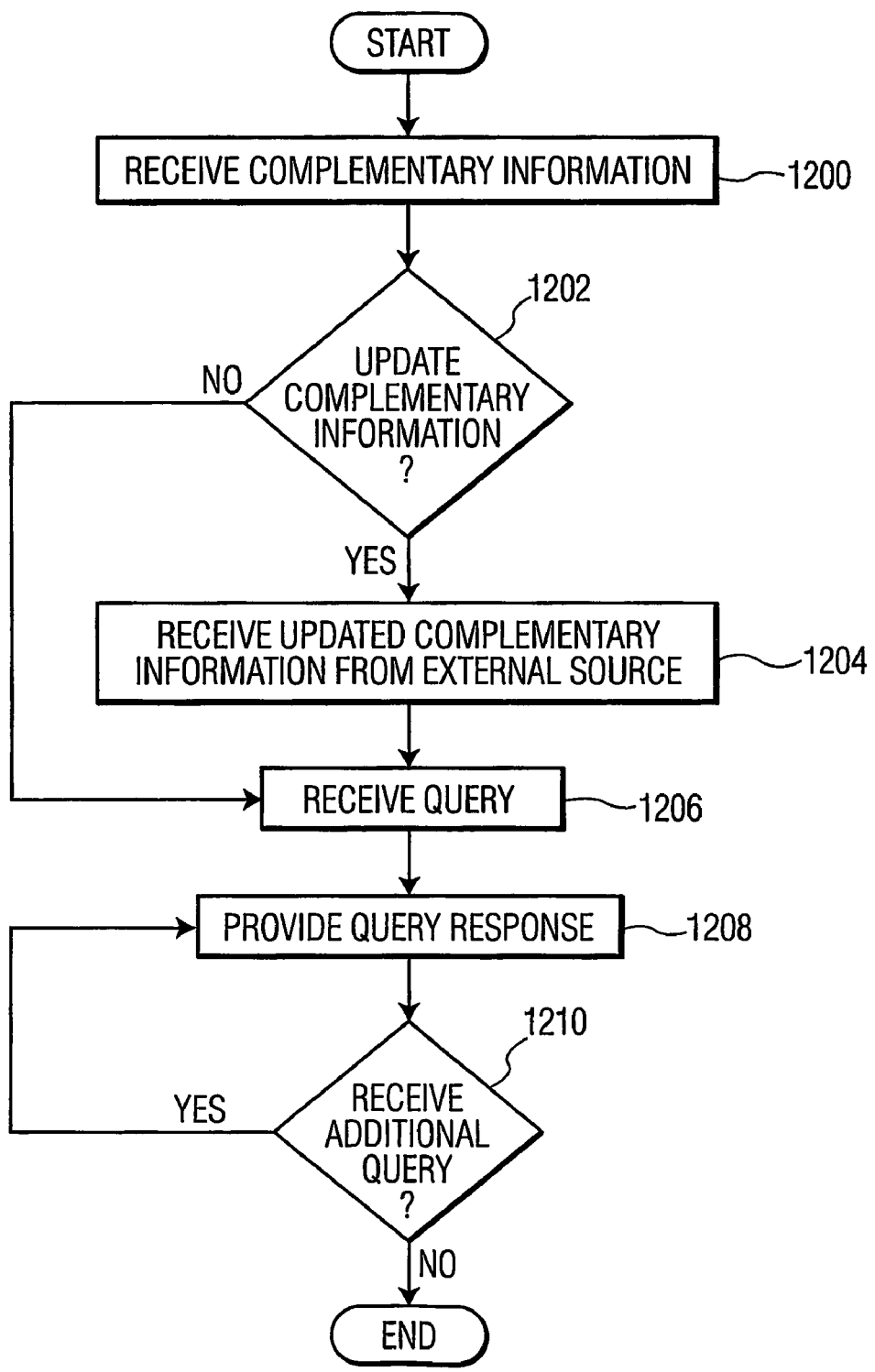

FIGS. 3A-F illustrate the user profile tables of FIG. 2 in accordance with one embodiment of the present invention;

FIGS. 4A-C illustrate the profile data matching tables of FIG. 2 in accordance with one embodiment of the present invention;

FIG. 5 illustrates the information content matching table of FIG. 2 in accordance with one embodiment of the present invention;

FIG. 6 is a block diagram illustrating a summary screen that may be displayed by the video display system of FIG. 1 in accordance with one embodiment of the present invention;

FIG. 7 is a block diagram illustrating a content zone screen that may be displayed by the video display system of FIG. 1 in accordance with one embodiment of the present invention;

FIG. 8 is a block diagram illustrating a content zone screen showing augmented stories that may be displayed by the video display system of FIG. 1 in accordance with one embodiment of the present invention;

FIG. 9 is a block diagram illustrating a remote control layout for the remote control of FIG. 1 in accordance with one embodiment of the present invention;

FIG. 10 is a flow diagram illustrating a method for providing personalized news to a consumer using the content augmentation application of FIGS. 1 and 2 in accordance with one embodiment of the present invention;

FIGS. 11A-F are screen shots illustrating complementary information screens that may be displayed by the video display system of FIG. 1 in accordance with several embodiments of the present invention; and FIG. 12 is a flow diagram illustrating a method for providing complementary information for a video program using the content augmentation application of FIGS. 1 and 2 in accordance with one embodiment of the present invention.

FIGS. 1 through 12, discussed below, and the various embodiments used to describe the principles of the present invention in this patent document are by way of illustration only and should not be construed in any way to limit the scope of the invention. In the description of the invention that follows, the present invention is integrated into, or is used in connection with, a television receiver. However, this embodiment is by way of example only and should not be construed to limit the scope of the present invention to television receivers. Thus, those skilled in the art will understand that the principles of the present invention may be implemented in any suitably arranged video display system.

FIG. 1 is a block diagram illustrating a video display system 100 that is operable to provide personalized news to a consumer in accordance with one embodiment of the present invention. For the illustrated embodiment, the video display system 100 comprises a content augmentation application 102 and a television receiver 104. Although the content augmentation application 102 is illustrated as a separate component from the television receiver 104, it will be understood that the content augmentation application 102 may be incorporated into the television receiver 104 without departing from the scope of the present invention.

The content augmentation application 102 is operable to receive incoming video, audio, text and any other suitable signals from an external source, such as a cable television service provider, a local antenna, a satellite, the Internet, a DVD player, a video cassette recorder, or the like. Thus, the incoming signals may be digital signals, analog signals, Internet protocol (IP) packets, or any other suitable type of signals.

The content augmentation application 102 is also operable to provide content to a consumer based on the received signals. For example, the content augmentation application 102 is operable to transmit television signals from a selected channel and/or radio signals from a selected station to the television receiver 104. A channel or station may be selected manually by the consumer, automatically by a recording device previously programmed by the consumer, or by any other suitable means.

The content augmentation application 102 is also operable to augment the content received from the external sources for the consumer. For example, as described in more detail below, the content augmentation application 102 is operable to personalize news content received from the external sources for a consumer, to provide complementary information related to the content when requested by the consumer, and to further augment the content for use by the consumer in any suitable manner.

The content augmentation application 102 may comprise an infrared (IR) sensor 110 that is operable to receive commands from a remote control device 112 operated by the consumer. The content augmentation application 102 also comprises a user interface 114 for providing personalized news and complementary information to the consumer. In order to accomplish this, the user interface 114 comprises a personalized news module 116 and a complementary information module 118, as described in more detail below. The television receiver 104 may comprise a screen 120, an infrared (IR) sensor 122, and one or more manual controls 124. The IR sensor 122 is operable to receive commands from the remote control device 112 operated by the consumer.

At least a portion of the personalized news module 116 and/or the complementary information module 118 may comprise logic encoded in media. The logic comprises functional instructions for carrying out program tasks. The media comprises computer disks or other computer-readable media, application-specific integrated circuits, field-programmable gate arrays, digital signal processors, other suitable specific or general purpose processors, transmission media or other suitable media in which logic may be encoded and utilized. Information module 118 may conform, for instance, to the teachings of U.S. Patent Publication No. 20020144293 entitled "AUTOMATIC VIDEO RETRIEVER GENIE" by N. Dimitrova et al and/or A. Janevski et al, "Enhanced Video Viewing From MetaData," *Proceedings of the SPIE ITCom*, August 2001.

FIG. 2 is a block diagram illustrating the content augmentation application 102 in accordance with one embodiment of the present invention. In addition to the IR sensor 110 and the user interface 114, the content augmentation application 102 may comprise a controller 200, a processor 202, and any other suitable components (not illustrated in FIG. 2). A suitable implementation of processor 202 may be found, for example, in A. Janevski et al, "Web Information Extraction for Content Augmentation," *Proceedings of IEEE ICME*, August 2002.

The controller 200 is operable to direct the overall operation of the content augmentation application 102. According to one embodiment, the controller 200 is operable to cause an incoming signal to be processed by the processor 202 and transmitted to the television receiver 104 and/or the user interface 114. For example, the controller 200 may be operable to cause a television signal from a cable service provider to be demodulated and processed by the processor 202 and transmitted to the television receiver 104 for viewing on the screen 120. As another example, the controller 200 may be operable to cause a news story from the Internet to be processed by the processor 202 and transmitted to the user interface 114 for further processing by the personal news module 116.

The processor 202 may comprise radio frequency (RF) front-end circuitry for receiving incoming television signals, tuning to a user-selected channel, and converting the selected RF signal to a baseband television signal suitable for display on the television receiver 104. The processor 202 is also operable to receive a conventional signal from an MPEG encoder/decoder and video frames from memory and to transmit a baseband television signal to the television receiver 104. In addition, the processor 202 may be operable to process video, audio, text and other suitable signals from other external sources, such as radio signals or signals from the Internet. It will be understood that the processor 202 may comprise one or more processors for processing the different types of signals.

The personalized news module 116 of the user interface 114 comprises a memory 210 and a processor 212. The memory 210 may comprise random access memory (RAM), a combination of RAM and read only memory (ROM), or any other suitable form of memory. According to one embodiment, the memory 210 may comprise a non-volatile RAM, such as flash memory. The memory 210 is operable to store a plurality of tables 214, 216 and 218 and personalized news 219. The tables comprise user profile tables 214, profile data matching tables 216 and an information content matching table 218. The personalized news 219 comprises news stories and other information that is identified and stored for the consumer based on the consumer's profile. The consumer's profile may include information relevant to the consumer as stored in the user profile tables 214 and the profile data matching tables 216. In addition, the memory 210 is operable to store information identifying the format in which the consumer desires to receive news.

The personalized news module 116 is operable to prioritize information for a consumer based on a personal profile of the consumer, broadcaster importance, and other suitable criteria, as stored in the tables 214, 216 and/or 218, to provide content to the consumer from multiple sources, such as television, radio, the Internet and the like, to provide content to the consumer in multiple formats, such as video, audio and/or text, and to provide personalized news for the consumer in any other suitable manner.

In operation, according to one embodiment, information from a variety of sources may be provided to a consumer on a single device, such as a television set. For example, news stories from the Internet, radio stations, and broadcast or cable television channels may be provided to the consumer on the single device.

In addition, the consumer may choose to receive the information in a variety of different formats, such as audio, visual and/or text. For those stories which are from a non-visual source, such as web stories, the personalized news module 116 generates a synthetic news anchor that "reads" the story to the consumer when the consumer desires to receive the information in a visual format. The personalized news module 116 may also generate a text story based on a television news story when the consumer desires to receive the information in a text format. Similarly, the personalized news module 116 may transform stories into any format in which the consumer desires to receive the information.

The processor 212 of the personal news module 116 identifies those stories of interest to the consumer based on the user profile tables 214 and the profile data matching tables 216. After identifying these stories, the processor 212 stores the stories in the personalized news 219 of the personalized news module 116. The processor 212 also prioritizes the stories based on the information content matching table 218 and presents the stories to the consumer when requested in the desired format.

In addition, for one embodiment, the personal news module 116 may store data for a plurality of consumers in the memory 210. For this embodiment, each consumer may provide identifying information to the personal news module 116 when using the user interface 114 to receive personalized news for that consumer.

The complementary information module 118 of the user interface 114 comprises a memory 220 and a processor 222. It will be understood that the processors 212 and 222 may be implemented in a single processor in the user interface 114 without departing from the scope of the present invention. The memory 220 may comprise random access memory (RAM), a combination of RAM and read only memory (ROM), or any other suitable form of memory. According to one embodiment, the memory 220 may comprise a non-volatile RAM, such as flash memory. The memory 210 is operable to store user data tables 224 and complementary information 226, as described in more detail below.

The complementary information module 118 is operable to provide information that is complementary to a video program to a consumer when that information is requested by the consumer. The complementary information module 118 is operable to perform this task by anticipating the information that may be requested and storing such information in the complementary information 226 of the memory 220, as well as storing user data that is specific to the consumer in the user data tables 224. In an alternative embodiment, the complementary information may be retrieved by the processor 222 from the video program itself as it is received from an external source.

For one embodiment, the complementary information module 118 is operable to provide a visual indicator to notify the consumer that complementary information is available upon request. For example, a "$" may notify the consumer that "how much" information is available and a "w" may notify the consumer that "who" information is available. It will be understood that the visual indicators may comprise any suitable form without departing from the scope of the present invention.

The data stored in the user data tables 224 may comprise data identifying video programs that have been previously viewed by a consumer. This data may be stored automatically by the processor 222 when a video program is played and/or may be stored manually by the consumer. In addition, for one embodiment, the user data tables 224 may store such data for a plurality of consumers. For this embodiment, each consumer may provide identifying information to the complementary information module 118 when using the user interface 114 to receive complementary information for a video program and/or to allow the complementary information module 118 to store the relevant user data in the user data tables 224 for that consumer.

The complementary information module 118 is also operable to synchronize complementary information 226 and a video program for the consumer, to provide control over access and navigation of the complementary information 226 to the consumer, to update the complementary information 226, and to provide complementary information 226 to the consumer by any other suitable means.

In operation, according to one embodiment, the complementary information module 118 may receive queries from consumers, such as "who queries," "what queries," "where queries," "when queries," "why queries," "how much queries," and/or any other suitable queries. The complementary information module 118 may then predict what information the consumer desires and access the complementary information 226 in order to retrieve that information. If the information provided by the complementary information module 118 is not the information that the consumer desired, the consumer may submit an additional query until the correct information is provided by the complementary information module 118. In an alternative embodiment, the consumer may specify what information he or she desires based on options provided by the complementary information module 118.

For one embodiment, the consumer may select an option that directs the complementary information module 118 to provide all the complementary information 226 for a particular video program or to provide specified subsets of the complementary information 226 for the video program.

Several options may be used in order to include complementary information with a video program that may be retrieved by the processor 222 and/or stored in the complementary information 226 of the complementary information module 118. A first option involves the creators of the video program annotating the video program during the creation process.

For a second option, the processor 222 may process and analyze the video program to extract complementary information. For example, optical character recognition technology may be used to read the credits and learn that a certain actor plays a character named Fred. Then, the processor 222 may analyze the visual, audio and transcript data for references to Fred and infer which onscreen character corresponds to Fred. The processor 222 may then learn to recognize the face and voice of the actor playing the part of Fred. Face recognition and voice identification for automatic person identification can be used for this purpose (see: Dongge Li, Gang Wei, Ishwar K. Sethi, and Nevenka Dimitrova, Person Identification in TV Shows, Journal on Electronic Imaging, special issue on Storage, Processing and Retrieval of Digital Media, October 2001).

A third option may combine the first and second options. For this option, the creators of the video program may insert any pertinent information they wish to include as complementary information, while the processor 222 may be able to analyze the video program in order to provide additional complementary information. For example, if a consumer requests information on an object in a scene, such as a wineglass, that is not included by the creators, the processor 222 may attempt to recognize the object and seek information about the object from the Internet or other suitable external data sources.

The complementary information module 118 may use at least two methods in order to update complementary information for a video program. First, the processor 222 may analyze the complementary information provided with the video program in order to determine how much time has passed since the complementary information was inserted or updated. If a predetermined amount of time has passed, the processor 222 may attempt to retrieve more updated information from external data sources and to store any such retrieved information as complementary information 226 for that video program.

Second, if the video program is being broadcast after a predetermined amount of time has passed since the complementary information was inserted or updated, the broadcasters may update the complementary information before the broadcast. In addition, local broadcasters may provide location-specific complementary information based on cities, zip codes, and the like for the area which will receive the broadcast.

In order to access the complementary information for a video program, consumers may use one of at least three different options. First, the consumer may generate a query, such as a "who query," a "what query," a "where query," a "when query," a "why query," a "how much query," and/or any other suitable query. According to one embodiment, the "who query" may comprise one or more of filmography, biography and rumors for an actor.

The "how much" query may be provided in accordance with the principles described in the U.S. patent application Ser. No. 10/014,258, filed Dec. 11, 2001, entitled. "A System for and Method of Shopping Through Television," by N. Dimitrova, J. Zimmerman, and R. Jasinschi, now U.S. Patent Application Publication No. 2003/0110507 A1.

The complementary information module 118 may then predict what information the consumer desires and access the complementary information in order to retrieve that information. If the information provided by the complementary information module 118 is not the information that the consumer desired, the consumer may submit an additional query until the correct information is provided by the complementary information module 118.

Second, the consumer may select an option that directs the complementary information module 118 to provide all the complementary information for a particular video program or to provide one or more specified subsets of the complementary information for the video program, such as actors' names, director's comments, or the like.

Third, the consumer may request that the complementary information be sent to a secondary screen, such as a personal digital assistant, a touch-screen remote control, a web pad, a mobile phone, or the like. For this option, the information provided to the secondary screen may be generated in accordance with either the first or second option or by any other suitable process.

Using the complementary information module 118, the user interface 114 may allow consumers to receive a variety of types of complementary information while viewing a video program. For example, a consumer may be watching a movie and recognize an actress but be unable to remember her name. The complementary information module 118 may provide this information to the consumer, along with telling the consumer which previous video programs the consumer has seen with that same actress based on the data in the user data tables 224. As another example, while viewing a soccer game, a consumer may select a particular player and receive statistics and other relevant information about that player from the complementary information module 118. Also, if a consumer is viewing a video program and sees an item that he or she would like to purchase, such as the shoes a particular character is wearing, the consumer may receive from the complementary information module 118 information such as a price and/or the name of a local retail outlet at which the item may be purchased. For one embodiment, the scene may be bookmarked by the consumer such that he or she may return at a more convenient time to receive the information. For this embodiment, any complementary information desired by the consumer may be identified by the consumer as delayed complementary information. This delayed complementary information may be viewed by the consumer at any later time, such as at the end of the video program.

FIGS. 3A-F illustrate the user profile tables 214 in accordance with one embodiment of the present invention. Although they are illustrated and discussed in table format, it will be understood that the user profile tables 214 may comprise any suitable data store operable to store the relevant information in any suitable manner.

FIG. 3A illustrates a personal profile table 300 that is operable to store personal data related to the consumer. For the illustrated embodiment, the personal profile table 300 comprises a name, a home address and a work address for the consumer. However, it will be understood that the personal profile table 300 may comprise any suitable personal data for the consumer without departing from the scope of the present invention.

FIG. 3B illustrates a traffic route table 310 that is operable to store traffic data related to the consumer. For the illustrated embodiment, the traffic route table 310 comprises a plurality of routes from the consumer's home to various destinations, including work. Each route (given in the left column) comprises an identification of the major roads over which the consumer typically travels to reach the corresponding destination (right column). It will be understood that the traffic route table 310 may comprise any suitable traffic data for the consumer without departing from the scope of the present invention.

FIG. 3C illustrates a traffic hot spot table 320 that is operable to store additional traffic data related to the consumer. For the illustrated embodiment, the traffic hot spot table 320 comprises a listing of the major roads over which the consumer typically travels. However, it will be understood that the traffic hot spot table 320 may comprise any suitable additional traffic data for the consumer without departing from the scope of the present invention. In addition, it will be understood that the traffic route table 310 and the traffic hot spot table 320 may be consolidated into a single traffic table without departing from the scope of the present invention.

FIG. 3D illustrates a financial table 330 that is operable to store financial data related to the consumer. For the illustrated embodiment, the financial table 330 comprises three columns: an identifying symbol, a type indicator, such as index, stock or mutual fund, and an entity name for each of a plurality of entities in which the consumer has an interest, financially or otherwise. However, it will be understood that the financial table 330 may comprise any suitable financial data for the consumer without departing from the scope of the present invention.

FIG. 3E illustrates a sports table 340 that is operable to store sports data for the consumer. For the illustrated embodiment, the sports table 340 comprises two columns: a sport name and a team name for each of a plurality of sports teams in which the consumer has an interest. However, it will be understood that the sports table 340 may comprise any suitable sports data without departing from the scope of the present invention.

FIG. 3F illustrates a headline table 350 that is operable to store headline data for the consumer. For the illustrated embodiment, the headline table 350 comprises participants 352, locations 354 and keywords 356. However, it will be understood that the headline table 350 may comprise any suitable headline data for the consumer without departing from the scope of the present invention.

For the illustrated embodiment, the participants 352 comprise a plurality of potential participants in news stories in which the consumer has an interest. For this embodiment, the participants 352 may refer to other user profile tables 214, such as the sports table 340 (all tracked sports teams), the financial table 330 (all tracked companies—stock), or the like, in order to identify the participants. In addition, specific participants, such as China, Bush, or the like, may be identified. The locations 354 comprise a plurality of potential locations from which news stories may originate or to which news stories may be relevant. Similarly, the keywords 356 comprise a plurality of topics or keywords that may appear in news stories of interest to the consumer.

FIGS. 4A-C illustrate the profile data matching tables 216 in accordance with one embodiment of the present invention. Although they are illustrated and discussed in table format, it will be understood that the profile data matching tables 216 may comprise any suitable data store operable to store the relevant information in any suitable manner.

FIG. 4A illustrates a local events table 400 that is operable to store prioritization data for local events for the consumer. For the illustrated embodiment, the local events table 400 provides for prioritizing local events based on a match to the consumer's profile, the distance of the event from the consumer's home, and an amount of time remaining until the event occurs. However, it will be understood that the local events table 400 may provide for prioritizing local events based on any suitable criteria without departing from the scope of the present invention. According to one embodiment, the consumer may specify the percentages associated with each criterion in the local events table 400. In addition, according to one embodiment, the criteria themselves may be selected by the consumer. Alternatively, the percentages and/or the criteria may be predetermined.

FIG. 4B illustrates a headline table 410 that is operable to store prioritization data for headlines for the consumer. For the illustrated embodiment, the headline table 410 provides for prioritizing headlines based on a match to the consumer's profile, broadcaster importance, as described in more detail below in connection with FIG. 5, and how current the headline is. However, it will be understood that the headline table 410 may provide for prioritizing headlines based on any suitable criteria without departing from the scope of the present invention. According to one embodiment, the consumer may specify the percentages associated with each criterion in the headline table 410. In addition, according to one embodiment, the criteria themselves may be selected by the consumer. Alternatively, the percentages and/or the criteria may be predetermined.

FIG. 4C illustrates a story table 420 that is operable to store prioritization data for stories other than headlines for the consumer. For the illustrated embodiment, the story table 420 provides for prioritizing stories other than headlines based on a match to the consumer's profile, broadcaster importance, as described in more detail below in connection with FIG. 5, and an amount of time since or until the occurrence of an event associated with the story. However, it will be understood that the story table 420 may provide for prioritizing stories based on any suitable criteria without departing from the scope of the present invention. According to one embodiment, the consumer may specify the percentages associated with each criterion in the story table 420. In addition, according to one embodiment, the criteria themselves may be selected by the consumer. Alternatively, the percentages and/or the criteria may be predetermined.

FIG. 5 illustrates the information content matching table 218 in accordance with one embodiment of the present invention. Although they are illustrated and discussed in table format, it will be understood that the information content matching table 218 may comprise any suitable data store operable to store the relevant information in any suitable manner.

The information content matching table 218 is operable to store data related to prioritization of news for the consumer. For the illustrated embodiment, the information content matching table 218 comprises broadcaster importance, story depth, and novelty. However, it will be understood that the information content matching table 218 may comprise any suitable prioritization data without departing from the scope of the present invention.

Broadcaster importance is a relative measure of the importance of a news story based on length, position within a broadcast or on a web page, or other suitable criteria. Story depth is an absolute measure of the importance of a news story based on length, new information of substance, quality of the reportage, such as who is interviewed and whether there is relevant action in the reportage, or other suitable criteria. Novelty is a measure of the overall novelty of the information within a news story based whether the story relates to a new event, is an update of an earlier story or is a continuing story about an earlier event.

According to the illustrated embodiment, the relative importance of broadcaster importance and novelty combine to 100%, while the story depth may comprise a binary filter of shallow or deep. However, it will be understood that these criteria may be otherwise weighted (for example, all of them can be binary filters or can have explicit numeric values) without departing from the scope of the present invention.

For one embodiment, the broadcaster importance may comprise a match to rank ordered stories and an amplification-based weighted measure, with the top stories receiving the heaviest matching. The story depth may comprise a match to select which story to present based on the binary filter. With clustered stories, only one story may be presented, with the consumer able to request the additional stories. The novelty may comprise a match to select the novel stories and follow up on ongoing stories.

FIG. 6 is a block diagram illustrating a summary screen 600 that may be displayed by the video display system 100 in accordance with a first embodiment of the present invention. The summary screen 600 comprises a banner 602 and a plurality of content zone summaries 604, 606, 608, 610, 612 and 614. The banner 602 may indicate the logo of the service provider, the number of stories found in each of the content zones, the total duration of those stories, and a current date and time.

Although the illustrated embodiment comprises six content zone summaries 604, 606, 608, 610, 612 and 614 with six corresponding content zones, it will be understood that any suitable number of any suitable type of content zone may be provided without departing from the scope of the present invention. The content zone summaries 604, 606, 608, 610, 612 and 614 comprise summaries of the information available in each of the corresponding content zones. For the illustrated embodiment, the content zone summaries comprise a weather zone 604, a traffic zone 606, a financial zone 608, a headline zone 610, a local event zone 612, and a sports zone 614.

While viewing the summary screen 600, a consumer may select one of the content zones in order to view a content zone screen with additional details and stories, direct the content augmentation application 102 to play all news stories in a particular content zone, direct the content augmentation application 102 to play all news stories in all content zones, direct the content augmentation application 102 to play selected stories from all content zones and/or select any other suitable task for the content augmentation application 102 to perform.

FIG. 7 is a block diagram illustrating a content zone screen 700 that may be displayed by the video display system 100 in accordance with one embodiment of the present invention. For this embodiment, the content augmentation application 102 begins to play news stories when the content zone screen 700 is selected for display by the consumer. Based on the consumer's profile, the content augmentation application 102 places the content zones in a particular order for playback.

The content zone that comprises the news stories currently being played, or the expanded content zone, is identified by a content zone label 702, and the stories for that content zone are played in an expanded zone 704. Alternatively, the content zone may be identified by a specific background pattern, with specific texture and/or animation. A channel label 706 identifies the source of the news story currently being played in the expanded zone 704, and the placement of the news story within that source is identified by a placement bar 708. The duration of the news story, as well as the elapsed time, is provided in a duration bar 710. An additional information section 712 may also identify the position of the story relative to the total number of stories for the expanded content zone, the status of the currently playing story, such as selected, new, seen, partially seen, saved, and the like, and any other relevant information.

A collapsed content zone section 720 comprises an identifier, a summary, or other suitable information corresponding to each of the content zones other than the expanded content zone. These collapsed content zones may be listed in the order in which they will be selected for playback based on the consumer's profile. Thus, as the news stories for each expanded content zone are completed, the expanded content zone may be moved to the bottom of the collapsed content zone section 720 and the content zone at the top of the collapsed content zone section 720 may become the next expanded content zone.

At any time during the playback of a story, the consumer may also select a full screen option, which causes the story to be played using the full screen 120. Thus, the collapsed content zone section 720, as well as the channel label 706, the placement bar 708, the duration bar 710, and the additional information section 712, may be hidden, allowing the expanded zone 704 to fill the entire screen 120. It will be understood that the full screen option may be modified to include allow the display of any of the channel label 706, the placement bar 708, the duration bar 710, and the additional information section 712 along with the expanded zone 704 without departing from the scope of the present invention.

FIG. 8 is a block diagram illustrating a content zone screen 800 that may be displayed by the video display system 100 in accordance with one embodiment of the present invention. A consumer may select a particular content zone from a summary screen, such as the summary screen 600 or 700. The selected content zone is identified by a content zone label 802. Alternatively, the content zone may be identified by a specific background pattern, with specific texture and/or animation.

If a consumer directs the content augmentation application 102 to play all the news stories for the content zone, the stories for that content zone are played in an expanded zone 804. A channel label 806 identifies the source of the news story currently being played in the expanded zone 804, and the placement of the news story within that source is identified by a placement bar 808. The duration of the news story, as well as the elapsed time, is provided in a duration bar 810. An additional information section 812 may also identify the position of the story relative to the total number of stories for the selected content zone, the status of the currently playing story, such as selected, new, seen, partially seen, saved, and the like, and any other relevant information.

A collapsed story section 820 comprises an identifier, a summary, or other suitable information corresponding to each of the stories other than the currently playing story. These collapsed stories may be prioritized in accordance with the data stored in the information content matching table 218, as described in more detail above in connection with FIG. 5. Thus, as each news story is completed, that story may be moved to the bottom of the collapsed story section 820 and the story at the top of the collapsed story section 820 may become the next expanded story to be played in the expanded zone 804. In addition, the consumer may manually select any one of the stories from the collapsed story section 820 for playback at any time.

At any time during the playback of a story, the consumer may also select a full screen option, which causes the story to be played using the full screen 120. Thus, the collapsed story section 820, as well as the channel label 806, the placement bar 808, the duration bar 810, and the additional information section 812, may be hidden, allowing the expanded zone 804 to fill the entire screen 120. It will be understood that the full screen option may be modified to include allow the display of any of the channel label 806, the placement bar 808, the duration bar 810, and the additional information section 812 along with the expanded zone 804 without departing from the scope of the present invention.

The content zone screen 800 comprises a clustered story button 824 that is operable to identify a story that has been augmented with additional information from the Internet, from other television channels, or the like, after the original story was posted or broadcast. By selecting a story identified by a clustered story button 824, the consumer may see this additional information. It will be understood that the position of the visual elements in the content zone screen 800 may be flexible and may be configurable by the consumer.

FIG. 9 is a block diagram illustrating a remote control layout 900 for the remote control 112 in accordance with one embodiment of the present invention. For this embodiment, the remote control 112 may allow a consumer to operate the personal news module 116 of the content augmentation application 102. The layout 900 may comprise two screens: a zones screen 902 and an action screen 904. It will be understood that the layout 900 may comprise a single screen or more than two screens without departing from the scope of the present invention.

The zones screen 902 comprises an action button 906, a weather button 908, a traffic button 910, a financial button 912, a sports button 914, an events button 916, and a headlines button 918. The action button 906 transitions to the summary screen 600 or 700 and transitions to the action screen 904. The weather button 908, the traffic button 910, the financial button 912, the sports button 914, the events button 916, and the headlines button 918 transition to the corresponding content zone screen 800.

The action screen 904 comprises a zones button 920, an info button 922, a play/pause button 924, a previous button 926, a next button 928, a play all button 930, a screen button 932, a profiles button 934, and a reset button 936. The zones button 920 transitions to the zones screen 902. The info button 922 extracts or contracts clustered stories for a selected story on a content zone screen 800. The play/pause button 924 toggles the story being played between play and pause.

The previous button 926 skips to the previous story. The next button 928 skips to the next story. When the previous button 926 or the next button 928 is pressed by the consumer, the previous or next story, respectively, starts playing automatically. The play all button 930 plays all news stories for a content zone or, from the summary screen 600, for all content zones. Thus, all news stories are strung together to form a personalized television show. For one embodiment, all the news stories may be played back from the summary screen 600 based on absolute priority regardless of the content zones.

The screen button 932 toggles between a full screen option and a summary or content zone screen 600, 700 or 800. The profiles button 934 toggles between a traffic profile and the traffic content zone. The reset button 936 returns all values to default values and starts a demonstration from the beginning.

FIG. 10 is a flow diagram illustrating a method for providing personalized news to a consumer using the content augmentation application 102 in accordance with one embodiment of the present invention. The method begins at step 1000 where the content augmentation application 102 receives news from external sources, such as a cable television service provider, a local antenna, a satellite, the Internet, a DVD player, a video cassette recorder, or the like. The news may comprise news stories and other newsworthy information, such as weather and traffic related information.

At step 1002, the processor 212 of the personal news module 116 identifies a subset of the received news for the consumer based on the consumer's profile. At step 1004, the processor 212 stores the identified news in the personalized news 219.

At step 1006, the content augmentation application 102 receives an activation request from the consumer. For example, the consumer may press a button on the remote control 112 in order to send the activation request to the infrared sensor 110 of the content augmentation application 102. The activation request comprises a request for the content augmentation application 102 to provide the news stored in the personalized news 219 to the consumer.

At step 1008, the processor 212 prioritizes the news stored in the personalized news 219 based on data stored in the information content matching table 218. At step 1010, the personal news module 116 provides a summary screen 600 or 700 to the consumer.

At decisional step 1012, a determination is made regarding whether or not the consumer has requested to view a particular content zone. If the consumer has not requested to view a particular content zone, the method follows the No branch from decisional step 1012 and returns to step 1000 where the content augmentation application 102 continues to receive news from external sources. Thus, the content augmentation application 102 may receive news twenty-four hours a day, seven days a week. However, if the consumer has requested to view a particular content zone, the method follows the Yes branch from decisional step 1012 to step 1014. At step 1014, the personal news module 116 provides the requested content zone screen 800 to the consumer.

At decisional step 1016, a determination is made regarding whether or not the consumer has requested to view another content zone. If the consumer has requested to view another content zone, the method follows the Yes branch from decisional step 1016 and returns to step 1014, where the personal news module 116 provides the requested content zone screen 800 to the consumer. However, if the consumer has not requested to view another content zone, the method follows the No branch from decisional step 1016 to decisional step 1018.

At decisional step 1018, a determination is made regarding whether or not the consumer has requested to view the summary screen 600 or 700. If the consumer has requested to view the summary screen 600 or 700, the method follows the Yes branch from decisional step 1018 and returns to step 1010, where the personal news module 116 provides the summary screen 600 or 700 to the consumer. However, if the consumer has not requested to view the summary screen 600 or 700, the method follows the No branch from decisional step 1018 and returns to step 1000 where the content augmentation application 102 continues to receive news from external sources.

FIGS. 11A-F are screen shots illustrating complementary information screens 1100*a-f* that may be displayed by the video display system 100 in accordance with several embodiments of the present invention. FIG. 11A comprises a complementary information screen 1100*a* that illustrates one embodiment of a complementary information display 1102*a* that may be displayed by the complementary information module 118 in response to a "what query" from a consumer. In this example, the complementary information module 118 predicts that the consumer is requesting information on the gun. As described in more detail above in connection with FIG. 2, the consumer may initiate a subsequent "what query" if the gun is not the object about which the consumer desires more information.

FIG. 11B comprises a complementary information screen 1100*b* that illustrates a first embodiment of a complementary information display 1102*b* that may be displayed by the complementary information module 118 in response to a "who query" from a consumer. In this example, the complementary information module 118 predicts that the consumer is requesting information about the actress in the foreground. As described in more detail above in connection with FIG. 2, the consumer may initiate a subsequent "who query" if the consumer desired information about the actor in the background instead.

FIG. 11C comprises a complementary information screen 1100c that illustrates a second embodiment of a complementary information display 1102c that may be displayed by the complementary information module 118 in response to a "who query" from a consumer. In this example, the complementary information module 118 predicts that the consumer is requesting information about the actress. As described in more detail above in connection with FIG. 2, the consumer may initiate a subsequent "who query" if the consumer desired information about the actor instead.

FIG. 11D comprises a complementary information screen 1100d that illustrates a third embodiment of a complementary information display 1102d that may be displayed by the complementary information module 118 in response to a "who query" from a consumer. In this example, the complementary information module 118 allows the consumer to select a particular actor from a plurality of images 1104. In addition, for this embodiment, the consumer may select from at least two information options 1106, such as "movies" and "rumors" and the like, to view a particular type of information related to the selected actor.

FIG. 11E comprises a complementary information screen 1100e that illustrates one embodiment of detailed complementary information that may be displayed by the complementary information module 118. In this embodiment, the complementary information module 118 allows the consumer to select from at least two query options 1108, such as "music," "cast," "location" and the like, to view additional information and/or options for selection.

For example, in the illustrated embodiment, the consumer has first selected the "cast" query option 1108, causing the complementary information module 118 to provide a plurality of images 1110 of cast members from which the consumer may select. The consumer has then selected the first cast member, Shirley Appleby, causing the complementary information module 118 to provide information about Shirley Appleby to the consumer in a complementary information display 1102e. Also, for the illustrated embodiment, the complementary information display 1102e indicates to the consumer by highlighting that the consumer has seen Shirley Appleby playing the role of Bridget Manilla in the movie, "The Thirteenth Floor." This information may be retrieved by the complementary information module 118 from the user data tables 224.

FIG. 11F comprises a complementary information screen 1100f that illustrates another embodiment of detailed complementary information that may be displayed by the complementary information module 118. In this embodiment, the complementary information module 118 allows the consumer to select from at least two query options 1112, such as "location," "clothes," "music," "cast," and the like, to view additional information and/or options for selection.

For example, in the illustrated embodiment, the consumer has first selected the "music" query option 1112, causing the complementary information module 118 to provide a plurality of images 1114 of recordings containing songs played in the corresponding video program from which the consumer may select. The consumer has then selected the first song, Dido's "Here With Me," causing the complementary information module 118 to provide information about the recording "No Angel," on which the song "Here With Me" appears, in a complementary information display 1102f. It will be understood that the position of the visual elements in the complementary information screens 1100 may be flexible and may be configurable by the consumer.

FIG. 12 is a flow diagram illustrating a method for providing complementary information for a video program using the content augmentation application 102 in accordance with one embodiment of the present invention. The method begins at step 1200 where the complementary information module 118 receives complementary information regarding a video program. The complementary information may be received directly from the video program and/or retrieved from the complementary information 226 in the memory 220 of the complementary information module 118.

At decisional step 1202, a determination is made regarding whether or not the complementary information needs to be updated. According to one embodiment, this determination is made based on whether or not a predetermined amount of time has passed since the complementary information was inserted or updated in the video program. If the complementary information needs to be updated, the method follows the Yes branch from decisional step 1202 to step 1204. At step 1204, the complementary information module 118 attempts to retrieve updated information from external data sources and to store any such retrieved information as complementary information 226 for that video program.

Returning to decisional step 1202, if the complementary information does not need to be updated, the method follows the No branch from decisional step 1202 to step 1206. Also, from step 1204, the method continues to step 1206. At step 1206, the complementary information module 118 receives a query from a consumer. The query may comprise a "what query," a "who query," a "music query," or any other suitable type of query operable to indicate to the complementary information module 118 what type of information the consumer desires to receive. The music query can be a query by humming, by matching the musical phrase in the movie to all known songs, or by any other suitable method.

At step 1208, the complementary information module 118 provides a query response to the consumer. In providing this response, the complementary information module 118 may access the user data tables 224 in order to include any consumer-specific data relevant to the response. For example, if the query is a "who query," the complementary information module 118 may access the user data tables 224 in order to determine what, if any, video programs the consumer has previously seen with the same actor that is identified by the complementary information module 118 in the query response.

At decisional step 1210, a determination is made regarding whether or not an additional query has been received from the consumer. If an additional query has been received from the consumer, the method follows the Yes branch from decisional step 1210 and returns to step 1208, where the complementary information module 118 provides a query response to the consumer. However, if no additional query has been received from the consumer, the method follows the No branch from decisional step 1210 and comes to an end.

Although the present invention has been described with several embodiments, various changes and modifications may be suggested to one skilled in the art. It is intended that the present invention encompass such changes and modifications as fall within the scope of the appended claims.

The invention claimed is:

1. A method for providing complementary information for a video program, said method comprising the steps of:
   receiving by a device complementary information for a video program;

receiving a query from a consumer, the query related to a specified portion of the complementary information; and providing a query response to the consumer based on the specified portion of the complementary information, wherein said method further comprises:

anticipating complementary information that might be requested by the consumer in response to said received complementary information and consumer profile data collected and stored in user data tables, and storing said anticipatory complementary information, and wherein said step of providing a query response comprises the substeps of:

predicting a type of information that the consumer desires more information about;

retrieving the stored anticipatory complementary information according to information of the predicted type; and providing the anticipatory complementary information as the query response, wherein if the predicted type information of the query response is not information desired by the consumer, then responsive to additional queries, providing additional anticipatory complementary information until correct desired information is provided via the complementary information of the query response.

2. The method as claimed in claim 1, wherein said method further comprises the step of:

determining whether a predetermined amount of time has passed since the complementary information was updated in the video program; and retrieving updated information from at least one external data source when the predetermined amount of time has passed since the complementary information was updated.

3. The method as claimed in claim 1, wherein said step of receiving complementary information comprising retrieving complementary information directly from the video program.

4. The method as claimed in claim 1, wherein the consumer profile data comprising data identifying video programs previously viewed by the consumer.

5. The method as claimed in claim 4, wherein said method further comprises the step of:

automatically storing the consumer profile data identifying video programs previously viewed by the consumer when the video programs are viewed by the consumer.

6. The method as claimed in claim 4, wherein said method further comprises the step of:

storing the consumer profile data identifying video programs previously viewed by the consumer based on manual input by the consumer.

7. The method as claimed in claim 1, wherein said method further comprises the step of:

extracting complementary information from the video program using automatic person identification.

8. The method as claimed in claim 1, wherein said method further comprises the step of:

receiving a request that the query response be sent to a secondary screen.

9. The method as claimed in claim 1, wherein visual elements of the query response are configurable by the consumer.

10. The method as claimed in claim 1, wherein said method further comprises the step of:

receiving from the consumer an identification of complementary information as delayed complementary information, and providing the delayed complementary information to the consumer at a later time.

11. The method as claimed in claim 1, wherein the query comprising one of a "who?" query, a "what?" query, a "where?" query, a "when?" query, a "why?" query and a "how much?" query.

12. The method as claimed in claim 1, wherein said method further comprises the step of:

providing a visual indicator to notify the consumer that complementary information is available upon request.

13. The method as claimed in claim 1, wherein said method further comprises the step of:

displaying the query response on a secondary screen synchronously with the video program.

14. A system for providing complementary information for a video program, said system comprising:

a complimentary information module including a memory operable to store user data tables and complementary information; and a processor operable to receive complementary information for a video program, to receive a query from a consumer, the query related to a specified portion of the complementary information, and to provide a query response to the consumer based on the specified portion of the complementary information, wherein prior to receiving a query, the processor anticipates complementary information that might be requested by the consumer in response to said received complementary information and consumer profile data collected and stored in user data tables, and storing said anticipatory complementary information, and wherein, in response to the query, the processor predicts a type of information that the consumer desires more information about, retrieves the stored anticipatory complementary information according to information of the predicted type, and provides the retrieved anticipatory complementary information as the query response, wherein if the predicted type information of the query response is not information desired by the consumer, then responsive to additional queries, providing additional anticipatory complementary information until correct desired information is provided via the complementary information of the query response.

15. The system as claimed in claim 14, wherein the processor is further operable to determine whether a predetermined amount of time has passed since the complementary information was updated in the video program and to retrieve updated information from at least one external data source when the predetermined amount of time has passed since the complementary information was updated.

* * * * *